(12) United States Patent
Griffin

(10) Patent No.: US 8,295,897 B2
(45) Date of Patent: Oct. 23, 2012

(54) MULTI-FUNCTION SLIDE ELEMENT FOR A MOBILE COMMUNICATION DEVICE

(75) Inventor: Jason Griffin, Kitchener (CA)

(73) Assignee: Research In Motion Limited, Waterloo, ON (CA)

( * ) Notice: Subject to any disclaimer, the term of this patent is extended or adjusted under 35 U.S.C. 154(b) by 564 days.

(21) Appl. No.: 12/028,142

(22) Filed: Feb. 8, 2008

(65) Prior Publication Data

US 2009/0203398 A1    Aug. 13, 2009

(51) Int. Cl.
*H04M 1/00*        (2006.01)
(52) U.S. Cl. .............. 455/575.4; 455/575.1; 455/575.2; 455/575.3; 455/566; 455/550.1
(58) Field of Classification Search .............. 455/550.1, 455/566, 575.1–575.4
See application file for complete search history.

(56) References Cited

U.S. PATENT DOCUMENTS

| | | | |
|---|---|---|---|
| 5,440,629 A | 8/1995 | Gray | |
| 5,485,517 A | 1/1996 | Gray | |
| D385,554 S | 10/1997 | Nuovo et al. | |
| 6,208,874 B1 | 3/2001 | Rudisill et al. | |
| 6,249,672 B1 | 6/2001 | Castiel | |
| 6,370,362 B1 | 4/2002 | Hansen et al. | |
| D466,096 S | 11/2002 | Takada | |
| 6,731,952 B2 | 5/2004 | Schaeffer et al. | |
| 6,822,871 B2 | 11/2004 | Lee et al. | |
| D509,206 S | 9/2005 | Jang | |
| 6,947,778 B2 | 9/2005 | Tsai | |
| D524,783 S | * 7/2006 | Lee | D14/138 AD |
| D525,225 S | 7/2006 | Lee | |
| D525,226 S | 7/2006 | Jang | |
| D525,227 S | 7/2006 | Jang | |
| D525,611 S | 7/2006 | Jang | |
| D526,297 S | 8/2006 | Lee et al. | |
| D527,365 S | 8/2006 | Jang | |
| D528,092 S | 9/2006 | Lee et al. | |
| D528,095 S | 9/2006 | Kwon et al. | |
| D528,533 S | 9/2006 | Lee et al. | |
| D529,014 S | 9/2006 | Kim et al. | |
| D529,473 S | 10/2006 | Kim et al. | |

(Continued)

FOREIGN PATENT DOCUMENTS

DE       29921010       3/2000
(Continued)

OTHER PUBLICATIONS

Samsung Electronics, Samsung Black Carbon SGH-d900 product information, printed from Samsung website, http://www.samsung.com/, on Apr. 25, 2007 and May 24, 2007.

(Continued)

*Primary Examiner* — Fayyaz Alam
(74) *Attorney, Agent, or Firm* — Borden Ladner Gervais LLP; Jeffrey W. Wong

(57) ABSTRACT

The application is directed at a mobile communication device comprising a body; and a sliding element, slidable longitudinally along the body; wherein the sliding element is slidable between a first and a second position, such that when said sliding element is in one of said first or second positions, an added device functionality is revealed to the user; and wherein when the sliding element is in the first or second position, a footprint of the mobile communication device is not changed.

20 Claims, 13 Drawing Sheets

U.S. PATENT DOCUMENTS

| | | | |
|---|---|---|---|
| D529,475 S | 10/2006 | Lee et al. | |
| D529,888 S * | 10/2006 | Lee et al. | D14/138 AD |
| D530,295 S | 10/2006 | Chung et al. | |
| D532,401 S | 11/2006 | Lee et al. | |
| D532,766 S | 11/2006 | Lee | |
| D535,272 S | 1/2007 | Kim et al. | |
| D536,690 S | 2/2007 | Lee | |
| 7,181,257 B2 | 2/2007 | Gordecki | |
| 2007/0254691 A1 * | 11/2007 | Lu | 455/550.1 |
| 2007/0273786 A1 * | 11/2007 | Ahn et al. | 348/373 |

FOREIGN PATENT DOCUMENTS

| | | | |
|---|---|---|---|
| EP | 1 513 323 | | 3/2005 |
| GB | 2347894 | | 9/2000 |
| JP | 2002 300257 | | 10/2002 |
| JP | 2007-215221 | * | 8/2007 |
| WO | 2007/147425 | | 12/2007 |

OTHER PUBLICATIONS

European Patent Office, Extended European Search Report for corresponding EP Application No. 08151197.4, Aug. 18, 2008.

European Patent Office, Examination Report for EP Application No. 08151197.4, Mar. 4, 2011.

* cited by examiner

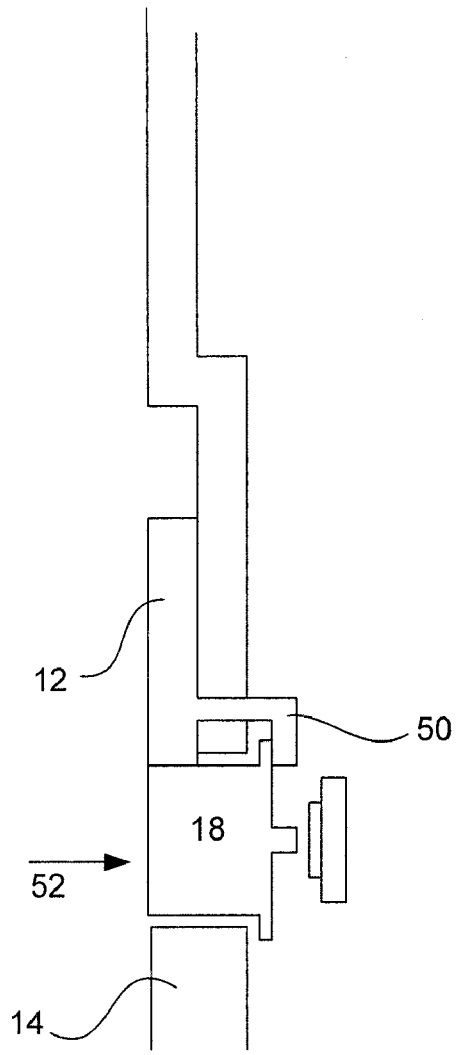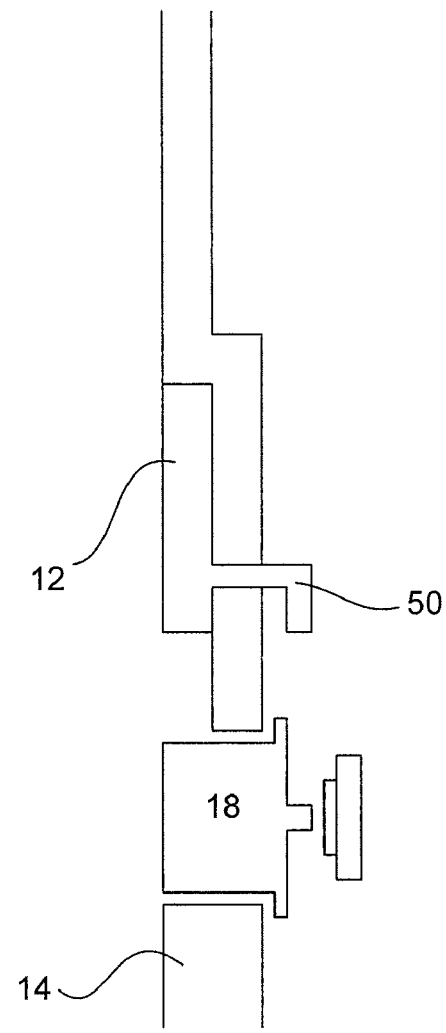
FIG. 6a  FIG. 6b

MULTI-FUNCTION SLIDE ELEMENT FOR A MOBILE COMMUNICATION DEVICE

FIELD OF THE INVENTION

The present application relates to a multi-function slide element for a mobile communication device.

BACKGROUND OF THE INVENTION

The development of mobile communication devices over the past decade has brought upon the evolution of increased functionality for these devices. Instead of being used solely for voice communication purposes, many current devices offer added functionality such as data communication, appointment tracking, memo writing, playing music or taking pictures. These added functionalities are typically integrated within the mobile communication device.

Generally, these added functionalities, along with basic functionalities, can be used at any time with user assistance or intervention. For instance, a user typically has to select an icon or press a button to start a music player or take a picture. Without a protective covering, the button or icon can be accidentally depressed thereby causing unwanted pictures to be taken or music to be played which, in turn, can drain a battery. This is especially problematic if the mobile communication device is located within a user's pocket or purse whereby the accidental button press goes unnoticed. Also, the parts performing the added functionality, such as a speaker or a camera lens, can easily get dirty if not covered.

BRIEF DESCRIPTION OF THE DRAWINGS

Embodiments of the present application will now be described, by way of example only, with reference to the attached Figures, wherein:

FIGS. 6a and 6b are side views of a locking mechanism for an actuator.

DETAILED DESCRIPTION

In a first aspect, the present application provides a mobile communication device comprising a body; and a sliding element, slidable longitudinally along the body within an overall dimensional footprint of the device, between first and second positions, such that the footprint does not change in sliding between the first and second positions; wherein when the sliding element is in one of the first or second positions, at least one selected function of the device is disabled, while in the other of the first or second positions the at least one selected function is not disabled.

In a further embodiment, there is provided a mobile communication device comprising a body; and a sliding element, slidable longitudinally along the body within an overall dimensional footprint of the device, between first and second positions, such that the footprint does not change in sliding between the first and second positions; wherein when the sliding element is in one of the first or second positions, the device is placed in a stand-by mode, while in the other of the first or second positions the device is in operational mode.

Generally, the present application provides a method and system for a multi-function sliding element, or portion, for a mobile communication device. The sliding portion can be in a first position or a second position whereby at least one selected mobile communication device functionality is disabled and when the sliding portion is in the other of the first or second position, the at least one selected communication device functionality is not disabled. Furthermore, when in the first or second position, additional device functionality can be revealed to a user. Whether the sliding portion is in the first or second position, the overall dimensional footprint of the device is not changed. In another embodiment, when the sliding element is in the first or second position, the device is placed in a stand-by mode and when in the other position is in an operational mode.

Figure 1A:
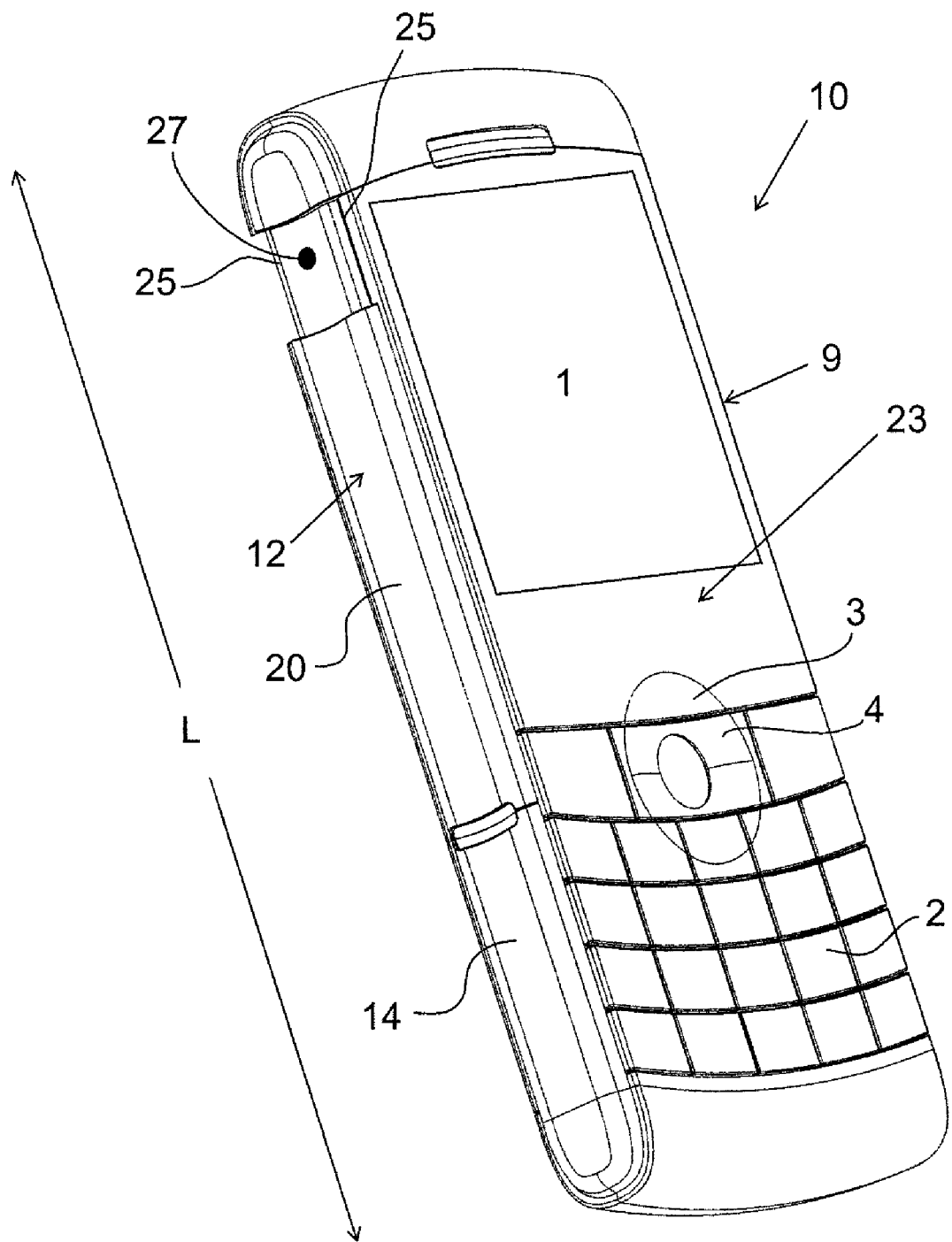
FIGS. 1a to 1d are front and rear perspective views of a mobile communication device with a sliding element in a first position.

Turning to FIGS. 1a to 1d, front and rear perspective views of a mobile communication device with the sliding element in a first position is shown. As shown in FIG. 1a, the mobile communication device 10 has a body 9 which includes a primary display screen 1, a keyboard/keypad 2, a set of buttons 3 and a trackball 4. It will be understood that the trackball 4 can also be a joystick, scroll wheel, roller wheel, trackball or touchpad or the likes, or another button. As will be further understood by one skilled in the art, the device includes other parts which are not shown or described as they are not essential to the current application.

The mobile communication device 10 further includes a sliding element 12 and a fixed portion 14 surrounding a frame 16 of the communication device 10. The sliding element 12 comprises two side portions 20, located along opposite lengths of the device, and a transverse portion 22 connecting the two side portions 20. The transverse portion 22 is located across a width (W) of a face 23, such as the rear face 23b, of the communication device 10. As shown in FIGS. 1a to 1d, the side portions 20 are preferably a pair of arms which extend away, perpendicularly, from the transverse portion 22, and mate with corresponding grooves, or tracks, 25 defined in the frame 16 of the mobile communication device 10. The grooves allow the sliding element 12 to slide longitudinally along a longitudinal axis (L) of the body 9 of the communication device 10. The grooves 25 also assist in preventing or restricting the sliding element 12 from being removed from the device 10.

Figure 1B:
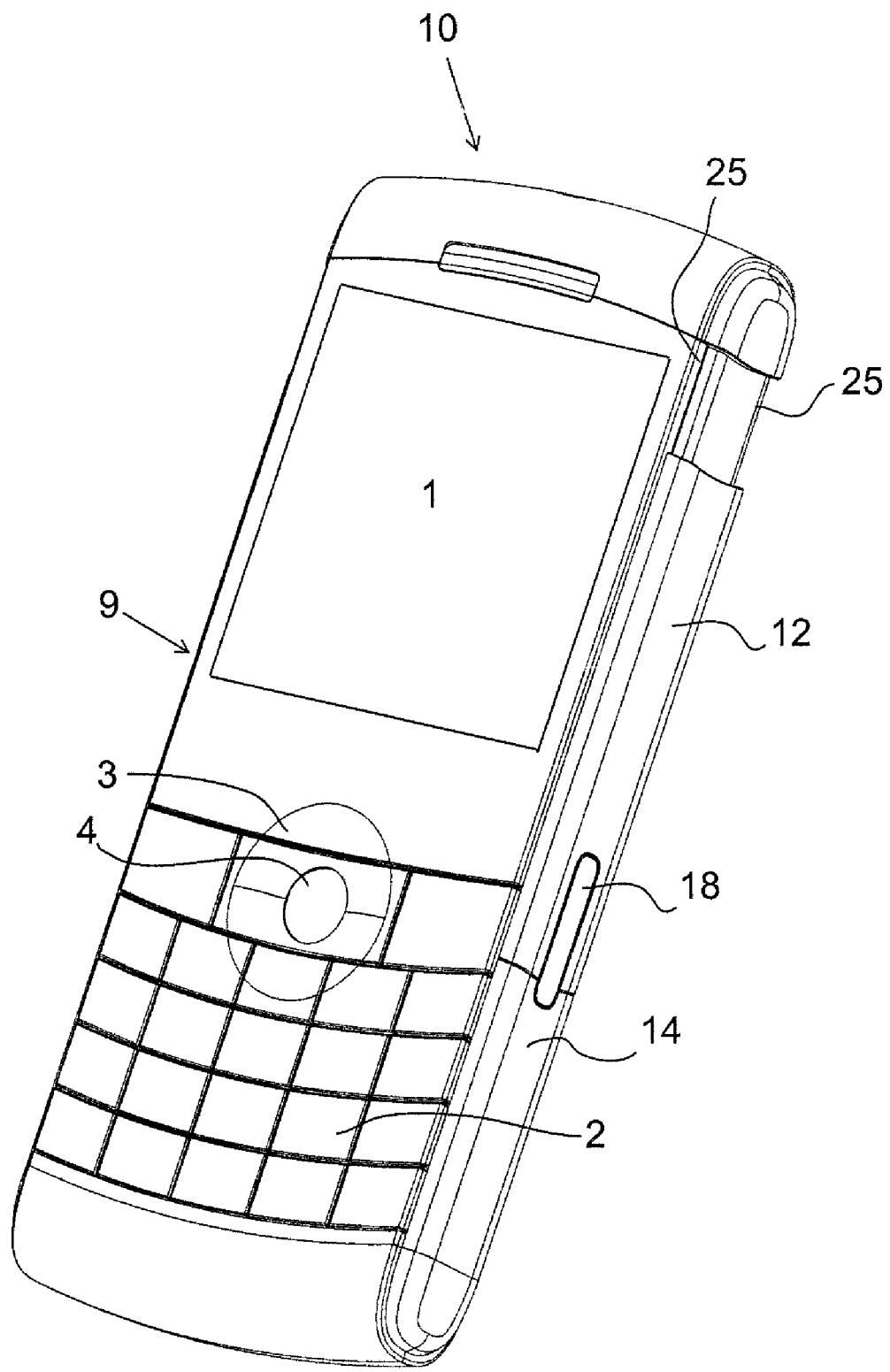
Figure 1C:
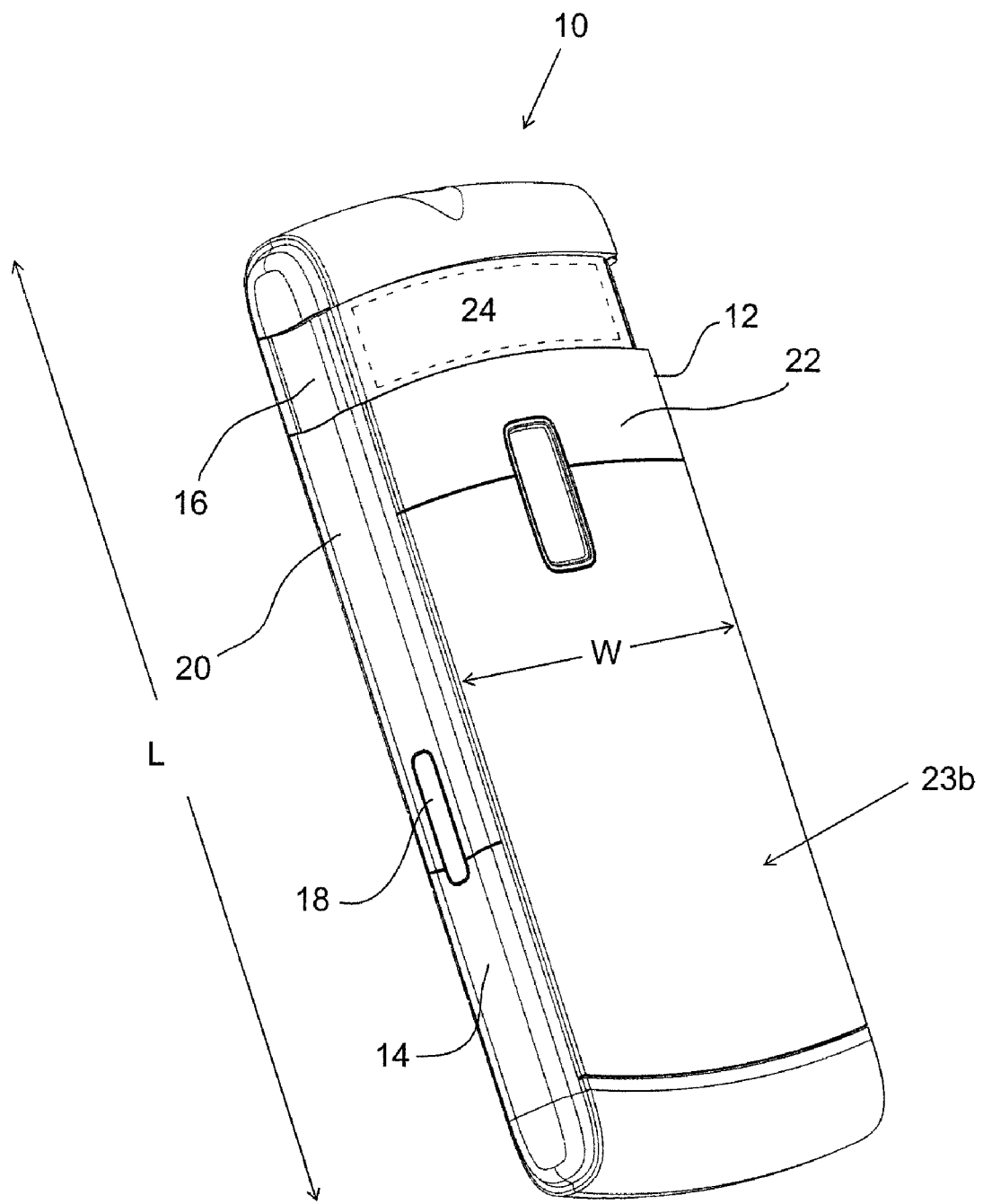
Figure 1D:
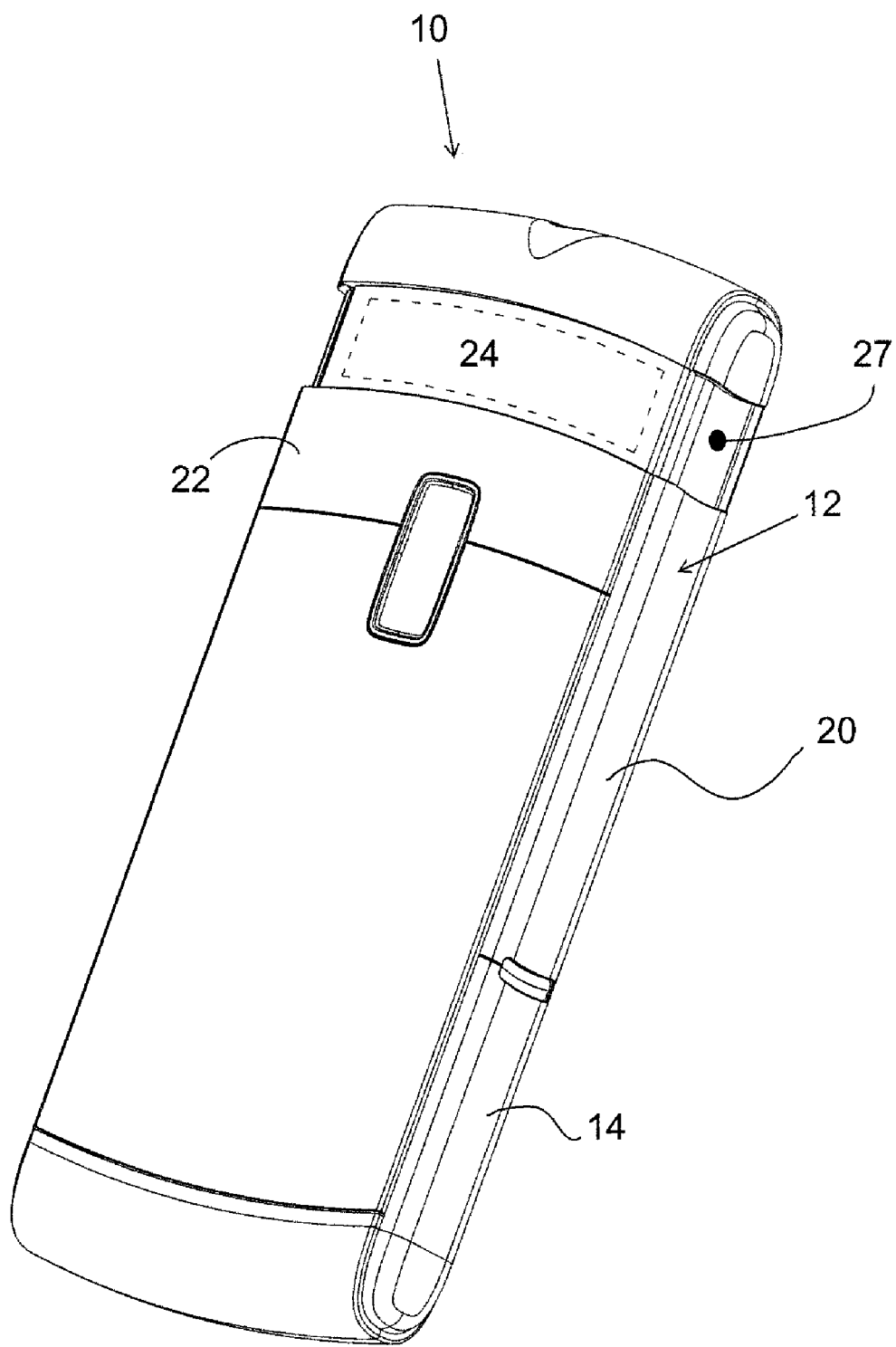

As shown in FIGS. 1b and 1c, a button 18, such as a camera shutter button, is located between, and surrounded by, the sliding portion 12 and the fixed portion 14 on one side of the device 10 and is held in place, with respect to the device, by the sliding element when the sliding element 12 is in the first position. The sliding element 12 operates as a lock to the button 18 so that that the button 18 can not be accidentally pressed. As shown, the surface of the button 18 is preferably flush with the surface of the sliding 12 and fixed 14 portions so that there is a smooth overall surface to the device 10, which further prevents the button 18 from being accidentally pressed. In this first position, the device is preferably in a stand-by mode whereby the keyboard and various other aspects of the device are locked from operation. Minimal power is used to perform basic functions (as described below) but power consumption is minimized.

The mobile communication device 10 can include a sensor 27, such as a Hall-effect sensor, to recognize the position of the sliding element 12 and to transmit a signal to a processor (not shown) within the communication device 10 to lock activation of the camera shutter button 18 or enter into a stand-by mode. Alternatively, the sensor can be used to unlock activation of the button 18 or exit the stand-by mode. In one embodiment, the sensor 27 is located on the surface of the device 10 in close proximity to the sliding element 12. The slide element 12 includes a magnet (not shown) such that when the sliding element 12 is adjacent the sensor, the sensor 27 can detect the presence of the magnet indicating the sliding element 12 is in one of the two positions. In a further embodiment, a mechanical detector can be mounted to the frame of the device that is activated by a tab or protrusion on the sliding element 12.

A software module (not shown), stored within the processor, is executed when the processor receives the signal from the sensor so that any depression of the shutter button 18 is ignored if the signal has not been transmitted. It is appreciated that alternate sensor devices can be used, as known in the art.

As shown in FIG. 1c, the mobile communication device 10 includes a secondary display screen 24, which is available for use by, or revealed to, the user when the sliding element 12 is in the first position. The display screen 24 can be used to display information such as the date, time or the number of unread messages on the device 10, or any other information.

Figure 1E:
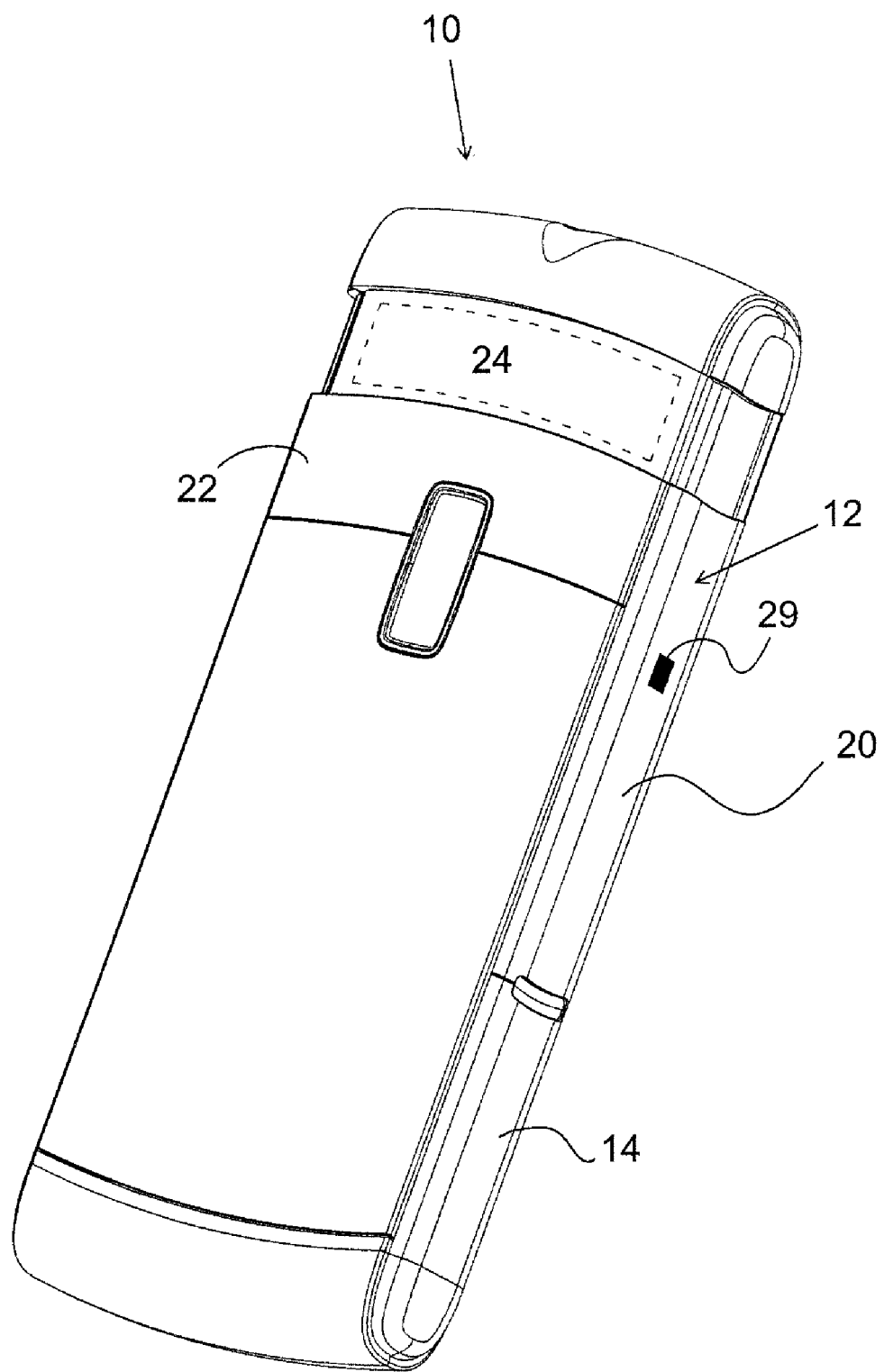
FIG. 1e is a rear perspective view of a second embodiment of a mobile communication device with a sliding element.
Figure 2A:
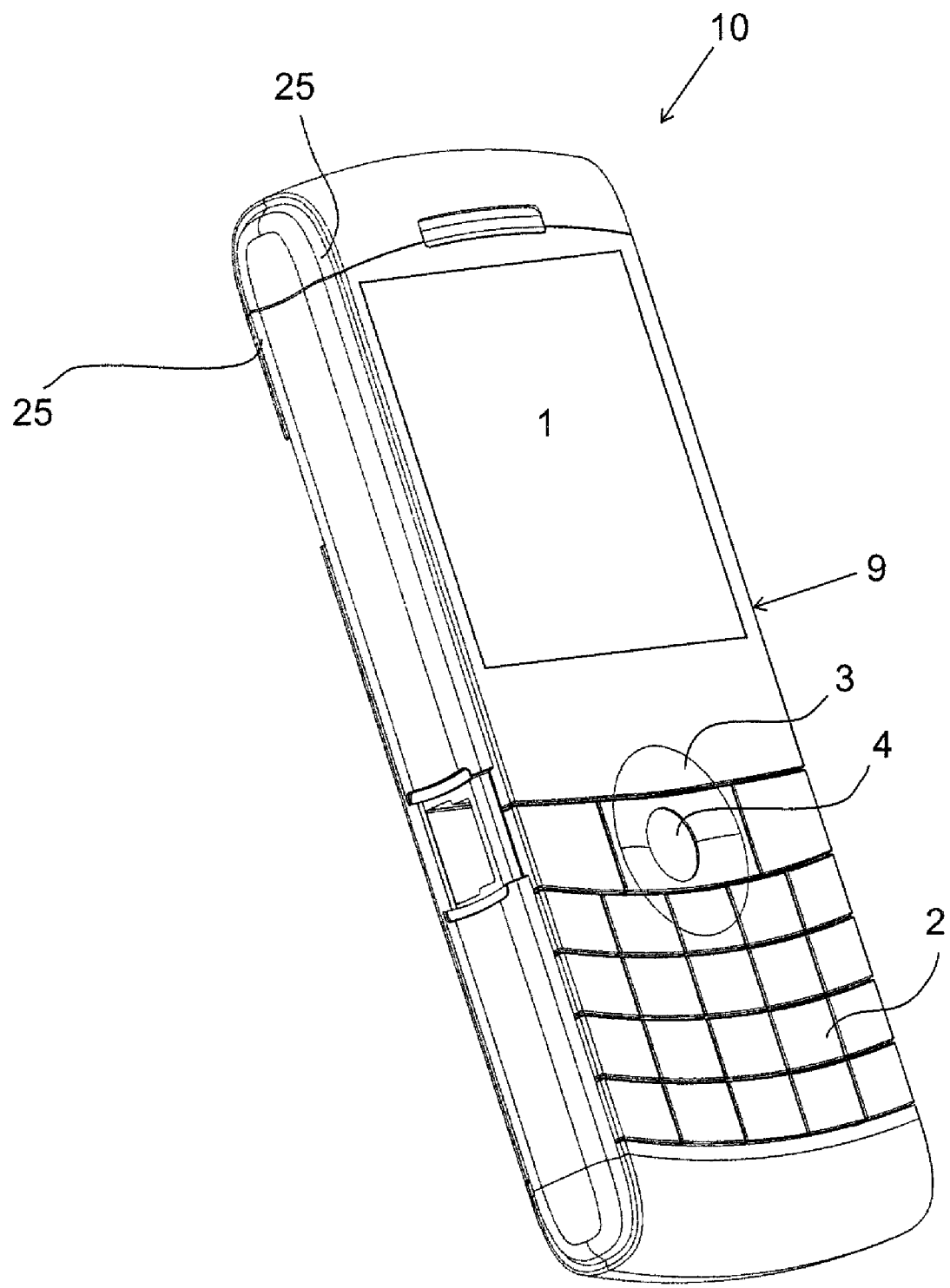
FIGS. 2a to 2d are front and rear perspective views of the mobile communication device of FIGS. 1a to 1d with the sliding element in a second position.
Figure 2B:
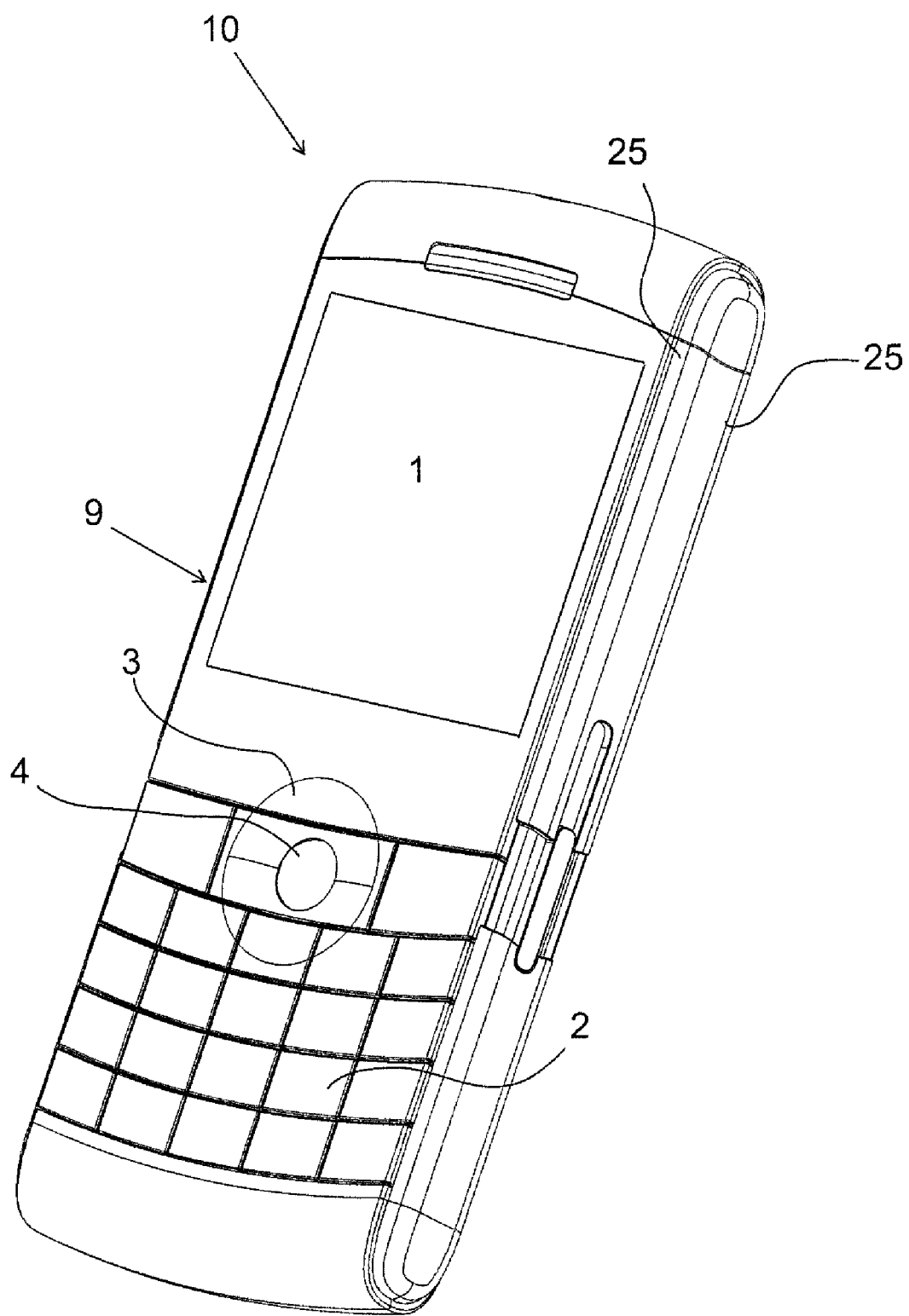
Figure 2C:
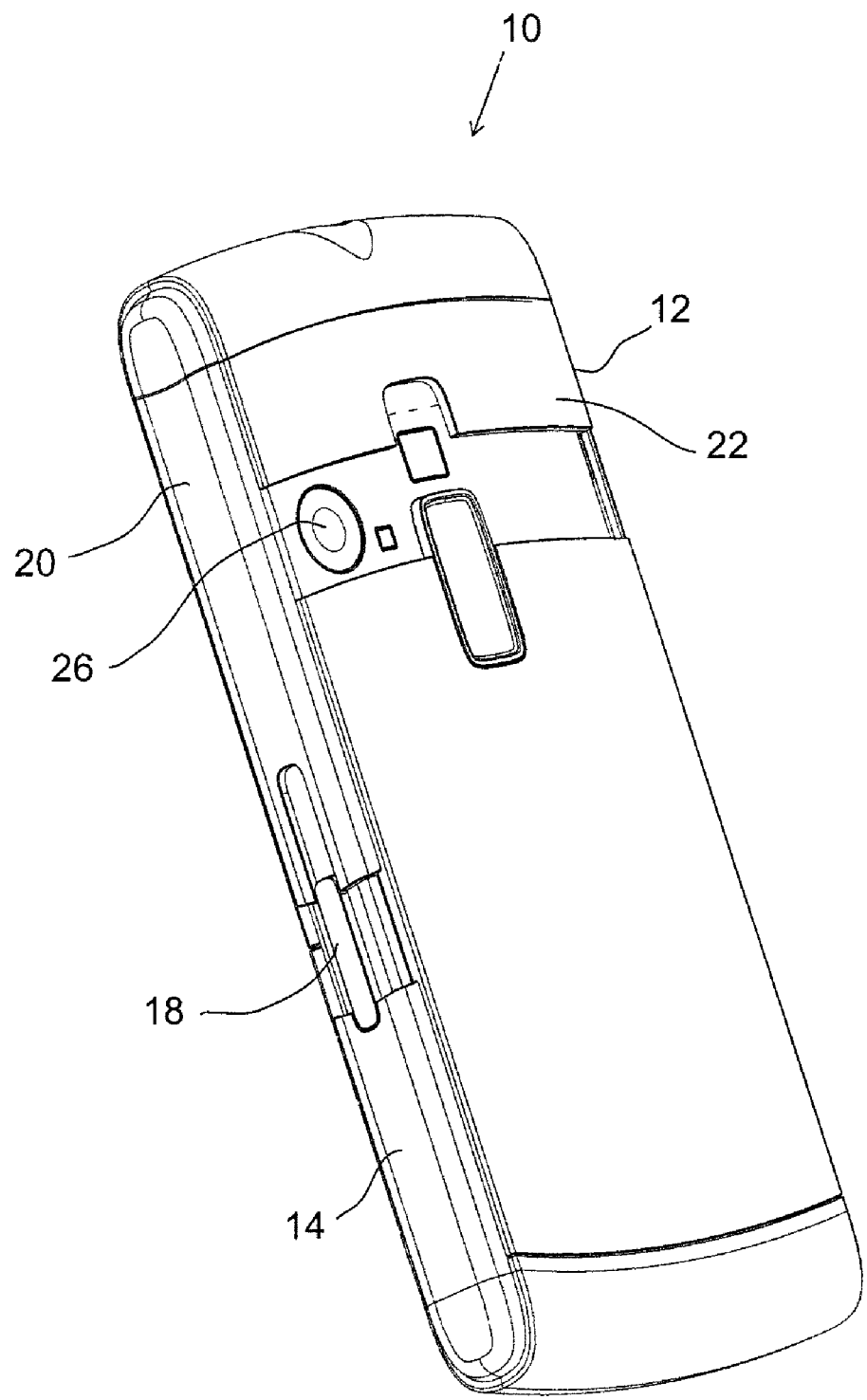
Figure 2D:
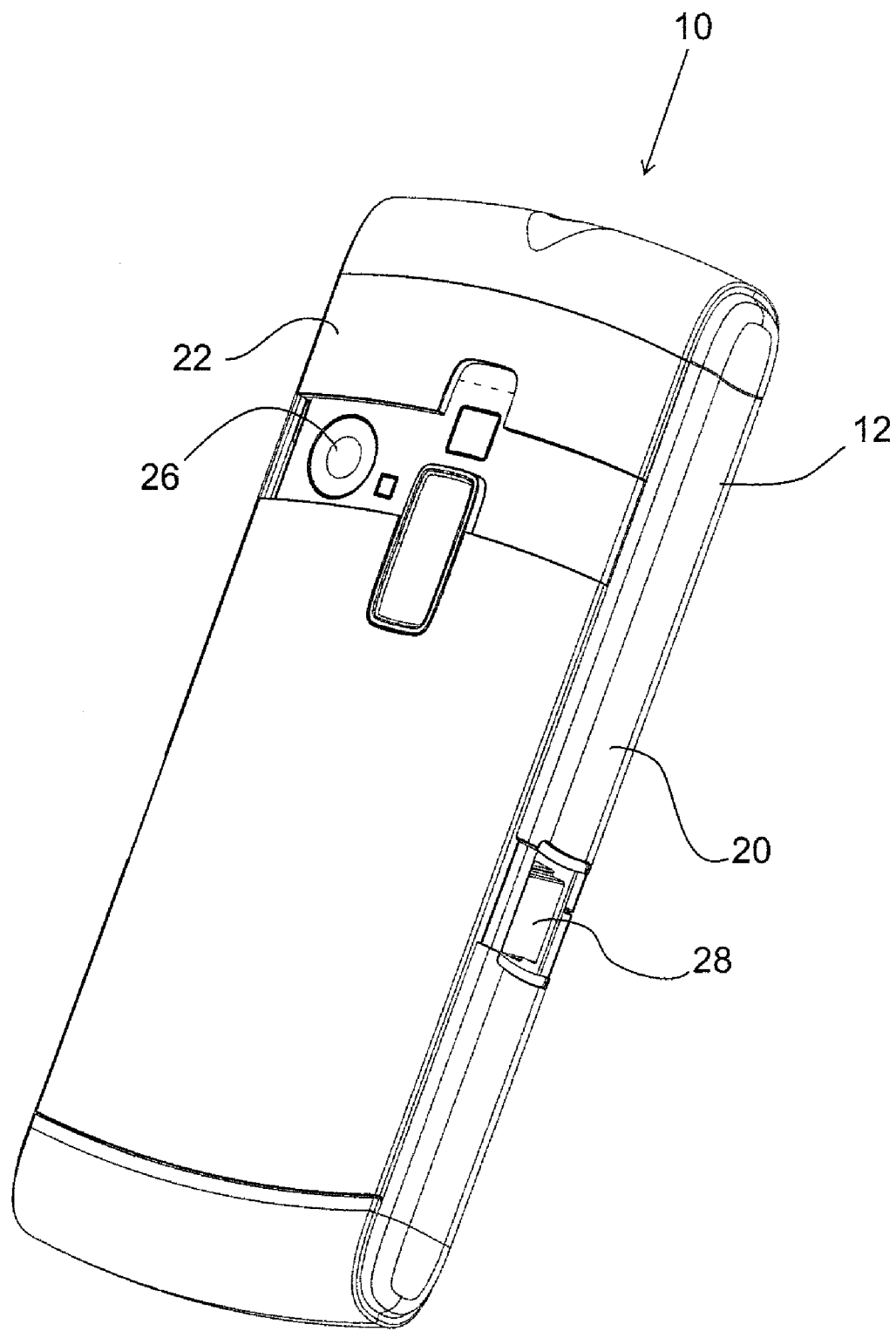

In an alternative embodiment as shown in FIG. 1e, the sliding element 12 is held in place by a locking tab 29 which must be released before the sliding element 12 can be moved to the second position.

Turning to FIGS. 2a to 2d, front and rear perspective views of the mobile communication device with the sliding element in a second position is shown. In the second position, the sliding element 12 has been urged away from the fixed portion 14 while maintaining an overall dimensional footprint of the device.

When the sliding element 12 is in the second position, the at least one selected device functionality, such as the camera shutter button 18, is enabled for use. This functionality includes a camera lens 26 (FIGS. 2c and 2d), which operates in cooperation with the camera shutter button 18 to provide the camera functionality. As will be understood, operation of the camera requires more than the camera shutter button 18 and the camera lens 26, however, this subject matter will be understood by one skilled in the art and is not illustrated. Furthermore, when the sliding element 12 is in the second position, access to a USB port 28 is also provided to the user. When in the second position, the sliding element 12 also covers the secondary display screen 24.

In a preferred embodiment, when the sliding element 12 is moved from the first position, a signal is transmitted to the processor (not shown) to exit the stand-by mode and enter an operational mode whereby full mobile communication device functionality is available to the user.

When the sliding portion 12 is in the first position, the transverse portion 22 of the sliding element 12 protects the camera lens 26 and one of the side portions 20 protects the USB port 28 from foreign particulates. Similarly, in the second position, the transverse portion 22 of the sliding element 12 protects the secondary display screen 24 from foreign particulates or damage.

Other examples of selected device functionalities which can be revealed to the user when the device is in the second position, include, but are not limited to, a set of control buttons, speakers, or both, for music playing functionality.

In the current embodiment, when in the first position, the sliding element 12 protects or restricts user access to at least one selected device functionality such that use of the selected functionality is disabled, while in the second position, the at least one selected device functionality is no longer disabled. This can be achieved by physically locking the functionality, such as the button, or by locking the device in a stand-by mode. As will be understood, the first position and the second position are interchangeable in that the at least one selected device functionality can be disabled when the sliding element 12 is in the second position and enabled when the sliding element 12 is in the first position.

Figure 3A:
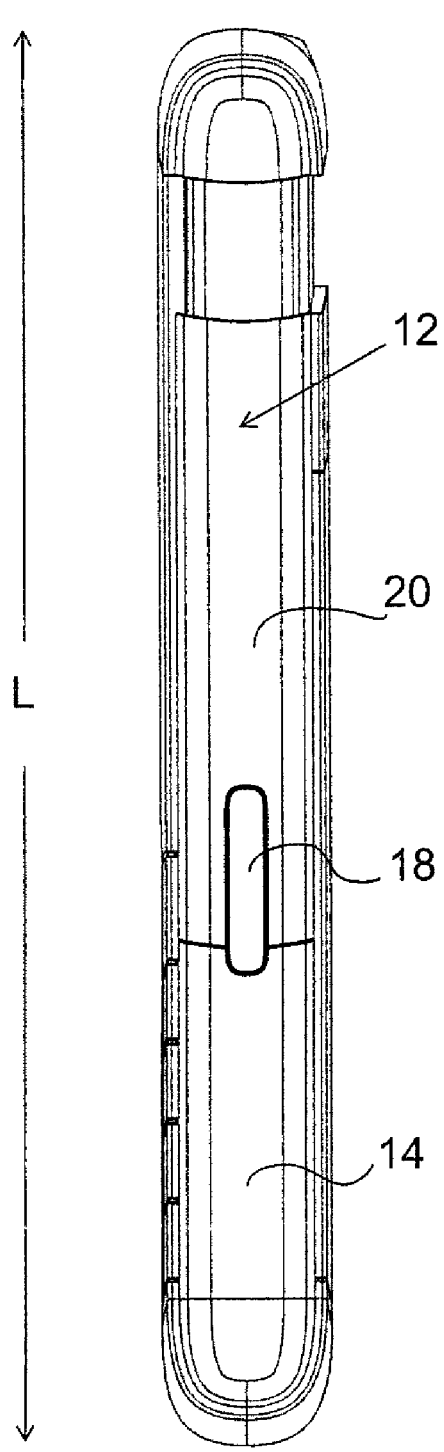
FIG. 3a is a side view of the mobile communication device with the sliding element in the first position.
Figure 3B:
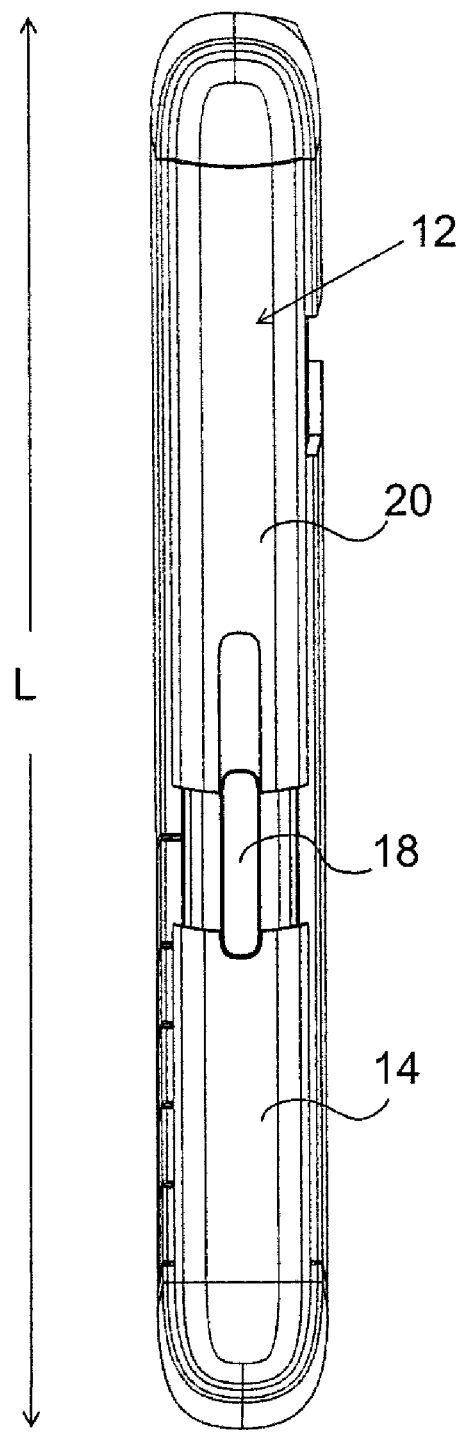
FIG. 3b is a side view of the mobile communication device with the sliding element in the second position.

FIGS. 3a and 3b are side views of the communication device 10 in the first position (FIG. 3a) and the second position (FIG. 3b). As can be seen in these Figures, when in the first or second position, the size of the device remains the same with only the sliding portion 12 moving with respect to the fixed portion 14. Therefore, the dimensional footprint of the mobile communication device 10 is not changed whether the device is in the first or second position thereby preserving the overall size of the device 10.

Figure 4:
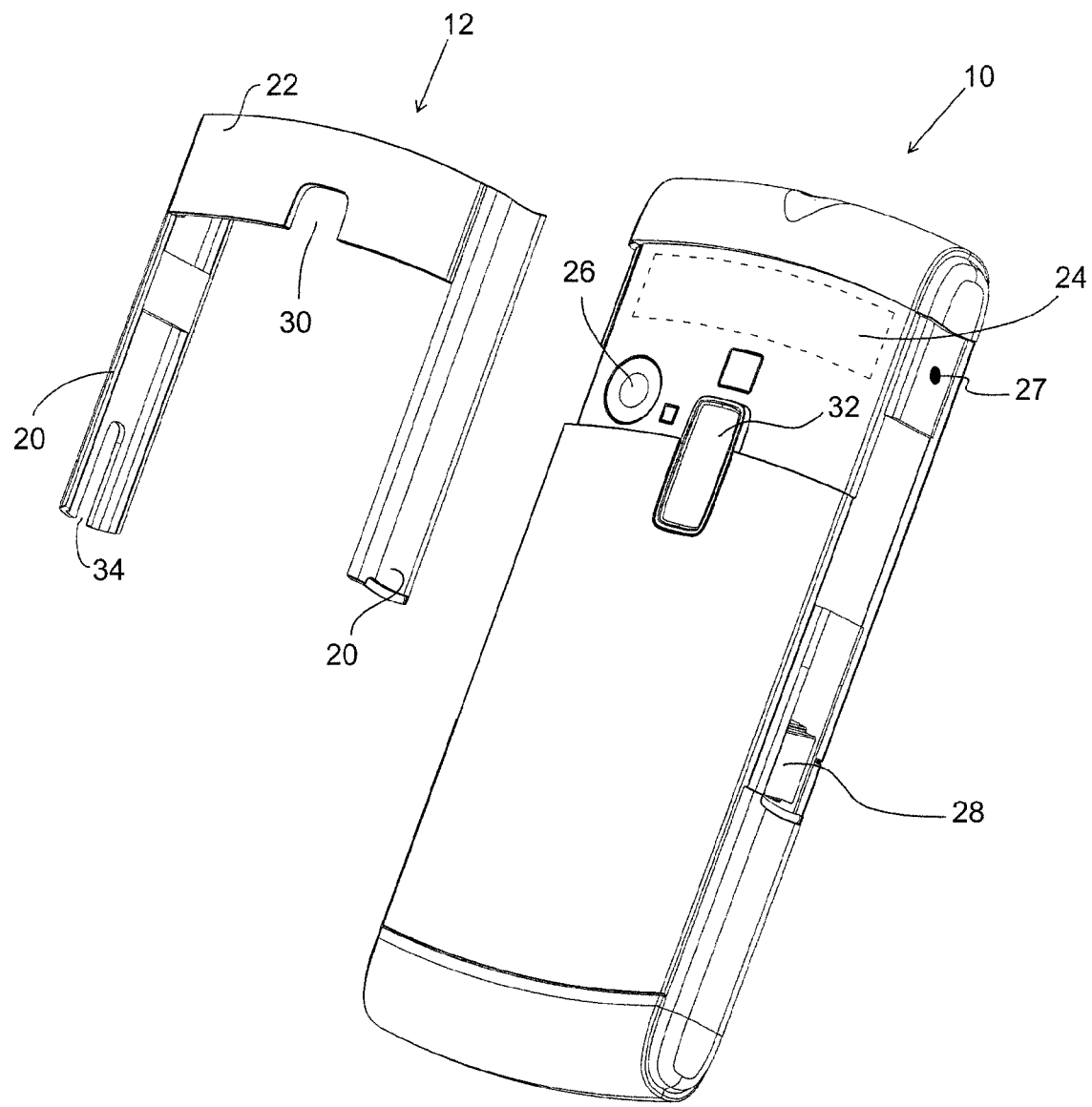
FIG. 4 is an exploded view of a first embodiment of a sliding element for use with a mobile communication device.

FIG. 4 provides an semi-exploded view showing the sliding element 12 detached from the mobile communication device 10. As can be seen, the sliding element 12 further includes a notch 30 which mates with a corresponding portion 32 on the mobile communication device 10 when the sliding element 12 is in the first position. This notch 30 and corresponding portion 32 can further serve to position the sliding element 12 in the first position. Also, the sensor (described above) can be located atop the notch 30 or the portion 32 to sense the location, or presence, of the sliding element 12. The sliding element 12 includes a cut-out portion 34 in one of its side portions 20 to receive the camera shutter button 18.

Figure 5:
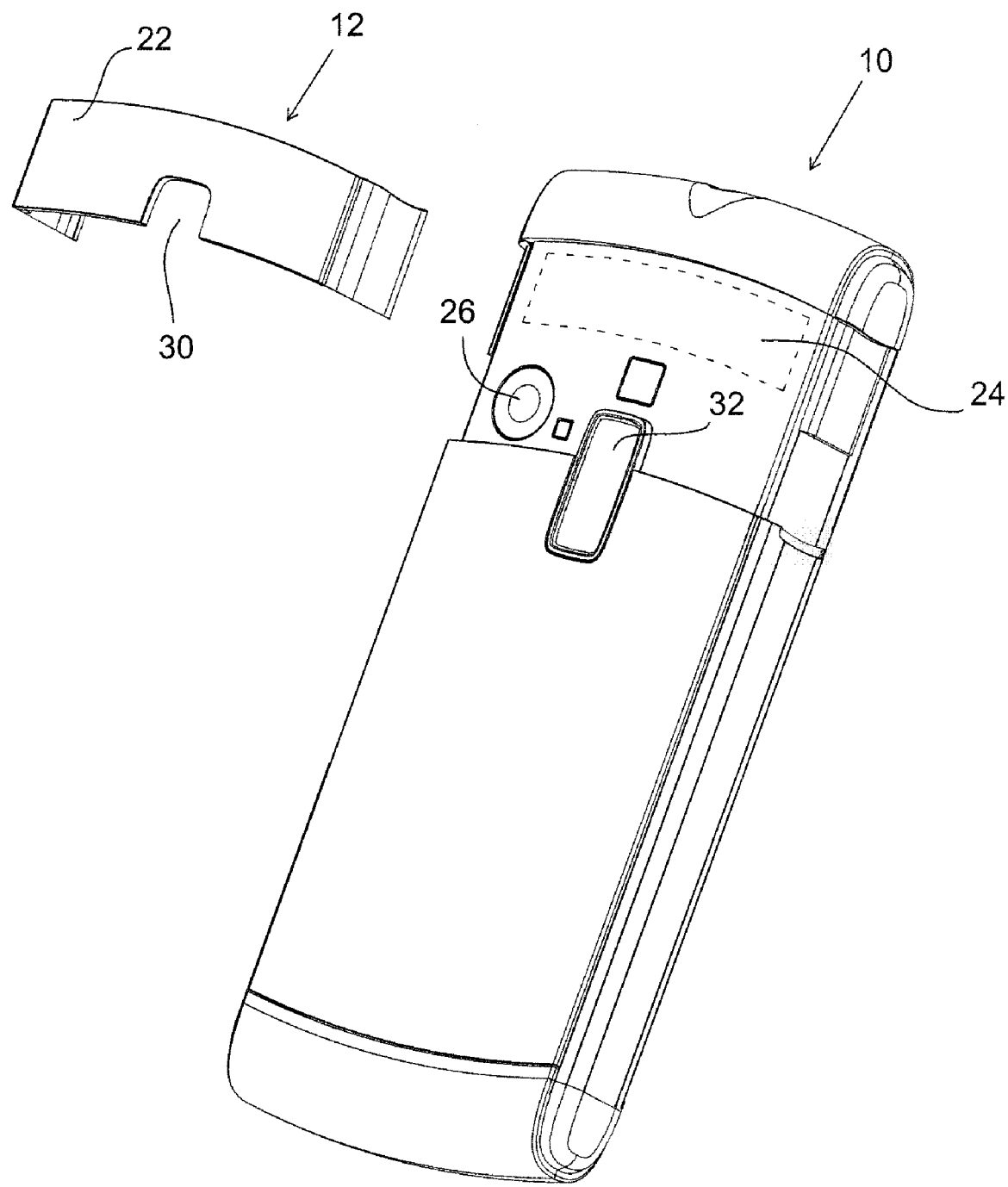
FIG. 5 is an exploded view of a second embodiment of a sliding element for use with a mobile communication device.

Turning to FIG. 5, a second embodiment of a sliding element 12 is shown. The size of the side portions 20 are reduced, such that they are the same height as the transverse portion. The sliding element 12 is used to protect the camera in the first position, and the secondary display screen 24 in the second position.

While in the first position, additional device functionality is revealed for use, while in the second position, the additional device functionality is no longer revealed, although this might not always be the case. As shown, when the sliding element 12 is in the first position, device functionality, such as the secondary display screen 24, is revealed to display information when the user is looking at the rear of the mobile communication device 10, while the additional device functionality is disabled. When the sliding element 12 is in the second position, the additional device functionality is no longer disabled, while the device functionality is covered.

In another embodiment, as schematically shown in FIGS. 6a and 6b, which show the sliding element in the first and second positions, respectively, the sliding element 12 includes a tab 50 that assists to restrict movement of the button 18 in an inward direction, as illustrated by arrow 52, when the sliding element is in the first position, to provide an additional safeguard against the button 18 being accidentally pressed. In the first position, the sliding element 12 and the fixed element 14 are both adjacent the button 18, thereby providing a smooth surface to the device 10. The tab 50 is located behind the button 18 and locks the button 18 in place. When the sliding element 12 is moved, or urged, to the second position, the tab 50 is also moved away from its locking position, thereby allowing the button 18 to be clicked, or urged inward, to activate an actuator button 52 within the device. The actuator button 52, is preferably pre-programmed with a predetermined device functionality.

In a further embodiment, if the device is not populated with a secondary display 24 or a camera 26, the space can be used as a storage cavity to store accessories/peripherals for the device. For example: GPS puck, memory cards (SD, micro-SD or CF cards), extra battery, Bluetooth® headset, etc. The accessories/peripherals can be specifically molded to fit into that space.

While the embodiments described herein are directed to particular implementations of the portable electronic device, it will be understood that modifications and variations to these embodiments are within the scope and sphere of the present application. For example, the size and shape of many of the features of the portable electronic device can differ while still providing the same function. Many other modifications and variations may occur to those skilled in the art. All such modifications and variations are believed to be within the sphere and scope of the present application.

What is claimed is:

1. A mobile communication device comprising:
a body; and
a sliding element, slidable longitudinally along the body within an overall dimensional footprint of the device, between a first and a second position, such that the footprint does not change in sliding between the first and second positions;
wherein when the sliding element is in one of the first or second positions, a button, located on a side of the mobile communication device, for activating a selected function of the device is physically locked, while in the other of the first or second positions the button is unlocked, wherein the button remains visible when the sliding element is in either of the first or second positions.

2. The mobile communication device of claim 1 where the selected function is selected from the group consisting of camera functionality and music playing functionality.

3. The mobile communication device of claim 1 wherein the device is configured such that, when the sliding element is in one of the first or second positions, an added device functionality is revealed to a user and while in the other of the first or second positions, the added device functionality is not revealed.

4. The mobile communication device of claim 3 wherein the added device functionality comprises a secondary display screen or a Universal Serial Bus (USB) port.

5. The mobile communication device of claim 1 wherein the sliding element extends across a face of the mobile communication device.

6. The mobile communication device of claim 5 wherein the face is a rear face.

7. The mobile communication device of claim 6 wherein the sliding element comprises:

a transverse portion, extending the width of the body; and
a pair of side portions, attached at opposite ends of the transverse portion.

8. The mobile communication device of claim 7 wherein the side portions are a pair of arms extending away from the transverse portion.

9. The mobile communication device of claim 8 wherein the side portions are located within grooves defined in a frame of the mobile communication device, and are configured to slide longitudinally along the body.

10. The mobile communication device of claim 7 wherein the side portions extend perpendicularly from the transverse portion and longitudinally along the body.

11. The mobile communication device of claim 1 further comprising a sensor for sensing when the sliding element is in one of the first or second positions.

12. The mobile communication device of claim 11 wherein the sensor is located on a frame of the mobile communication device.

13. The mobile communication device of claim 3 further comprising a tab for restricting access to the added device functionality when the sliding element is in one of the first or second positions.

14. The mobile communication device of claim 1 further comprising a locking element for locking the sliding element in the one of the first or second positions.

15. The mobile communication device of claim 14 wherein the locking element is located on the sliding element.

16. The mobile communication device of claim 1, wherein when the sliding element is in one of the first or second positions, the device is placed in a stand-by mode, while in the other of the first or second positions the device is in an operational mode.

17. The mobile communication device of claim 2, wherein when the sliding element is in one of the first or second positions, the device is placed in a stand-by mode, while in the other of the first or second positions the device is in an operational mode.

18. The mobile communication device of claim 3, wherein when the sliding element is in one of the first or second positions, the device is placed in a stand-by mode, while in the other of the first or second positions the device is in an operational mode.

19. The mobile communication device of claim 7, wherein when the sliding element is in one of the first or second positions, the device is placed in a stand-by mode, while in the other of the first or second positions the device is in an operational mode.

20. The mobile communication device of claim 11, wherein when the sliding element is in one of the first or second positions, the device is placed in a stand-by mode, while in the other of the first or second positions the device is in an operational mode.

* * * * *